United States Patent [19]
Hirtsiefer

[11] Patent Number: 5,546,705
[45] Date of Patent: Aug. 20, 1996

[54] SUPPORT FOR HOLDING A CLOSING ELEMENT

[75] Inventor: Artur Hirtsiefer, Neunkirchen-Seelscheid, Germany

[73] Assignee: Huwil-Werke GmbH, Ruppichteroth, Germany

[21] Appl. No.: 315,759

[22] Filed: Sep. 30, 1994

[30] Foreign Application Priority Data

Oct. 2, 1993 [DE] Germany .............. 9314977 U

[51] Int. Cl.⁶ .............. E05F 1/10; E05D 15/50
[52] U.S. Cl. .............. 49/386; 16/294; 16/296; 49/193; 220/335
[58] Field of Search .............. 49/386, 193; 220/335; 16/293, 294, 296

[56] References Cited

U.S. PATENT DOCUMENTS

| | | | |
|---|---|---|---|
| 1,331,556 | 2/1920 | Blood | 49/386 X |
| 1,345,261 | 6/1920 | Sellek | 49/386 X |
| 4,295,245 | 10/1981 | Malcom | |
| 4,738,329 | 4/1988 | Gauer | 49/386 X |
| 4,829,712 | 5/1989 | Itoh | 49/386 X |
| 5,029,362 | 7/1991 | Prodan | 16/296 X |

FOREIGN PATENT DOCUMENTS

| | | |
|---|---|---|
| 0047826 | 3/1982 | European Pat. Off. . |
| 0422678A1 | 4/1991 | European Pat. Off. . |
| 1222294 | 6/1960 | France . |
| 192269 | 9/1906 | Germany . |
| 694865 | 7/1940 | Germany . |
| 2016287 | 10/1971 | Germany . |
| 2800985A1 | 7/1979 | Germany . |
| 2653106C2 | 4/1984 | Germany . |
| 527160 | 10/1940 | United Kingdom . |
| 702781 | 1/1954 | United Kingdom . |

*Primary Examiner*—Philip C. Kannan
*Attorney, Agent, or Firm*—Harness, Dickey & Pierce

[57] ABSTRACT

A support for holding a closed element, such as a flap or lid in a closed or open position relative to a container has a first and second arm. One of the arms is connected to the container by a first pivot bearing and the other arm is connected to the closing element by a second pivot bearing. The two arms are connected to one another by a third pivot bearing and by a pressure spring operational between the arms. The two arms are supported relative to one another in a first arm position, which corresponds to the closed position, where the pivot bearings are close to one another, or in a second position, which corresponds to the open position, where the pivot bearings are positioned remote from one another.

8 Claims, 3 Drawing Sheets

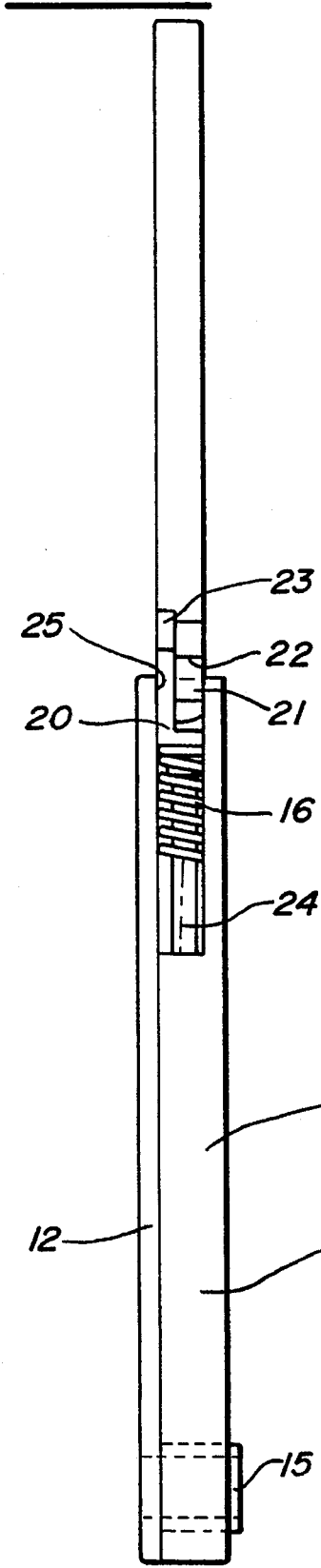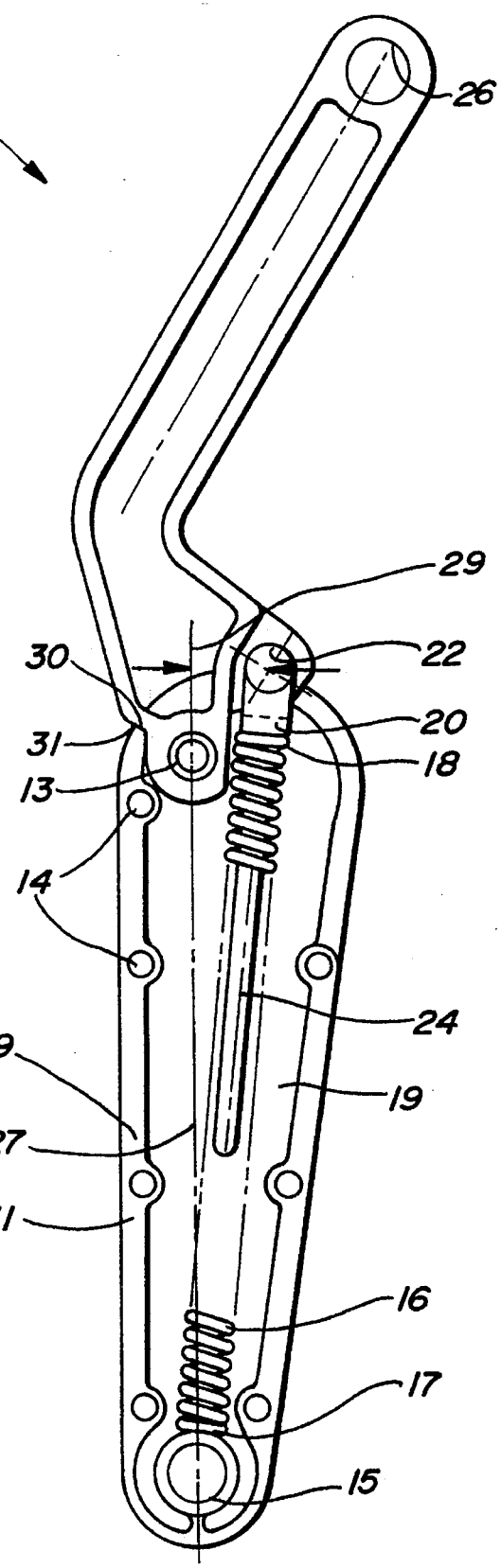

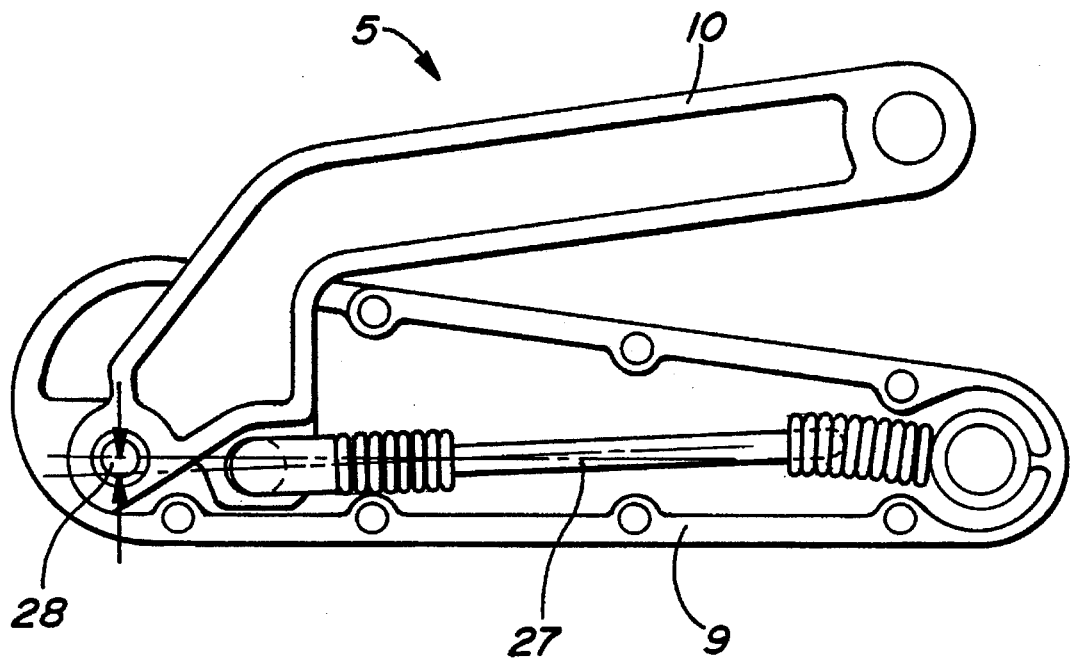

5,546,705

SUPPORT FOR HOLDING A CLOSING ELEMENT

BACKGROUND OF THE INVENTION

The invention relates to a support for holding a closing element, especially a flap or lid, in a closed or open position relative to a container. The support has a first and a second arm, with one of the arms connected to the container by a first pivot bearing and the other arm connected to the closing element by a second pivot bearing. The two arms are connected to one another by a third pivot bearing and by a pressure spring operational therebetween. The two arms are supported relative to one another in a first arm position, which corresponds to the closed position, where the pivot bearings are close to one another, or in a second arm position, which corresponds to the open position, where the pivot bearings are positioned remote from one another.

Such a support is described in DE 26 53 106 C2. In this case, the two arms of the support are supported relative to one another indirectly by a spring. The spring loads a slide. The slide is movably arranged on one of the supports and, by means of a supporting contour provided on its end face, rests against corresponding supporting faces of the other arm. The slide locks the two arms in the arm position which corresponds to the open position of the closing element and container. It also serves to secure the arms relative to one another in their position which corresponds to the closed position of the closing element and container. The disadvantage of such an embodiment is that disadvantageous friction conditions may lead to self-inhibition and thus a blocking action when opening the door. And there exists a further disadvantage in that because of the outer slide contour and the opening for the rod, the injection mould is complicated and expensive.

SUMMARY OF THE INVENTION

It is an object of the invention to provide a support which has a simple design and assumes a secure closing position so that the forces required to keep the container closed or open can be accurately predetermined.

In accordance with the invention,, the objective is achieved in that one end of the pressure spring is supported on the first arm and the other end on the second arm. At the second arm, the pressure spring is supported eccentrically relative to the third pivot bearing connecting the two arms. In the position of the arms corresponding to the open position, the point of application of the pressure spring at the second arm is offset towards one side of the connecting line extending between the center of the first pivot bearing at the first arm and the third pivot bearing between the two arms. In the closed position it is offset towards the other side of the connecting line.

One advantage of this embodiment is that few components are required for the support. The forces required for the closed position or open position can easily be achieved and predetermined by replacing the spring or changing the supporting conditions of the second arm relative to the first arm by the spring. Furthermore, the injection mould for the housing features a simple shape and can be produced cost-effectively.

To limit the movement of the arms towards the open position it is proposed to delimit the position of the arms relative to one another by stops.

To achieve the necessary closing force of the closing element relative to the container, it is proposed that, with reference to the connecting line, the eccentricity and thus the effective lever arm of the pressure spring in the position of the arms corresponding to the closed position and the spring characteristics of the pressure spring are preferably based on the required closing force.

To be able to apply the necessary supporting force for supporting the closing element relative to the container in the open position, it is proposed that, with reference to the connecting line, the eccentricity and thus the effective lever arm of the pressure spring in the position of the arms corresponding to the open position and the spring characteristics of the pressure spring are based on the supporting force required for the closing element.

A particularly advantageous embodiment is achieved by the first arm including a housing and a cover. A throughaperture for the second arm is provided between the housing and the cover. The second arm is laterally guided between the housing and the cover. The pressure spring is accommodated in the cavity between the cover and the housing.

One advantage of this embodiment is that no movable part projects into the interior of the container. Thus, movement cannot be obstructed by any items located in the container and be caught. This is particularly significant in the case of roof trunks for motor vehicles.

To guide the pressure spring, it is slipped onto a guiding rod which is connected to a bearing lever. The bearing lever and a bearing bore of the second arm constitute the supporting means for the pressure spring on the second arm.

The parts are preferably injection molded out of plastics, especially acetal homopolymer (POM).

Advantages of the support in accordance with the invention become particularly obvious if the support is arranged at a container with a closing element which is optionally pivotable around one or the other of the two side edges extending parallel relative to one another. The pivot bearing of the first arm at the container and the pivot bearing of the second arm at the closing element each are articulated centrally between the two side edges at the container and the closing element, respectively. By arranging and designing the support as explained above, it is possible to open the lid from two sides. Such an assembly is also very advantageous for roof trunks for motor vehicles because it permits access from the most advantageous side of the vehicle.

From the following detailed description taken in conjunction with the accompanying drawings and subjoined claims, other objects and advantages of the present invention will become apparent to those skilled in the art.

BRIEF DESCRIPTION OF THE DRAWINGS

The use of the support in accordance with the invention on a roof trunk and the design of same are more obvious from the drawings and explained with reference thereto.

FIG. 3 is a plan view of the support, with the arms being in a position relative to one another corresponding to the open position of the closing element relative to the container.

FIG. 4 is a side view according to FIG. 3, with the lid removed relative to the first arm.

FIG. 5 is a view like FIG. 4 with the arms in a position relative to the support, which corresponds to the closed position of the closing element relative to the container.

DETAILED DESCRIPTION OF THE PREFERRED EMBODIMENT

Figure 1:
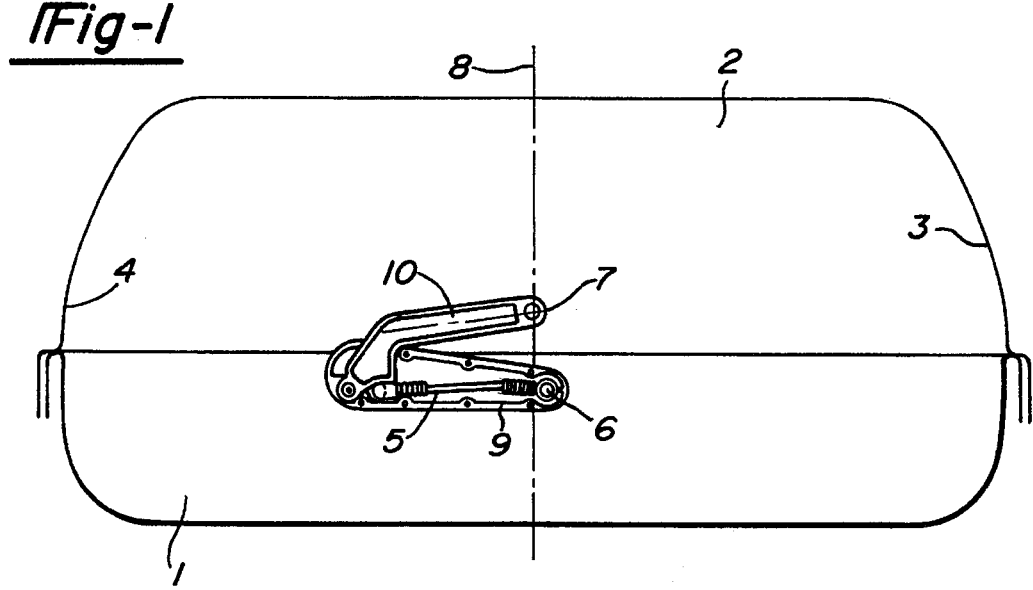
FIG. 1 is a cross-sectional view through a roof trunk, with the closing element in the form of a lid in the closed condition relative to the bottom trunk part, constituting the container, with a plan view of the support interior.
Figure 2:
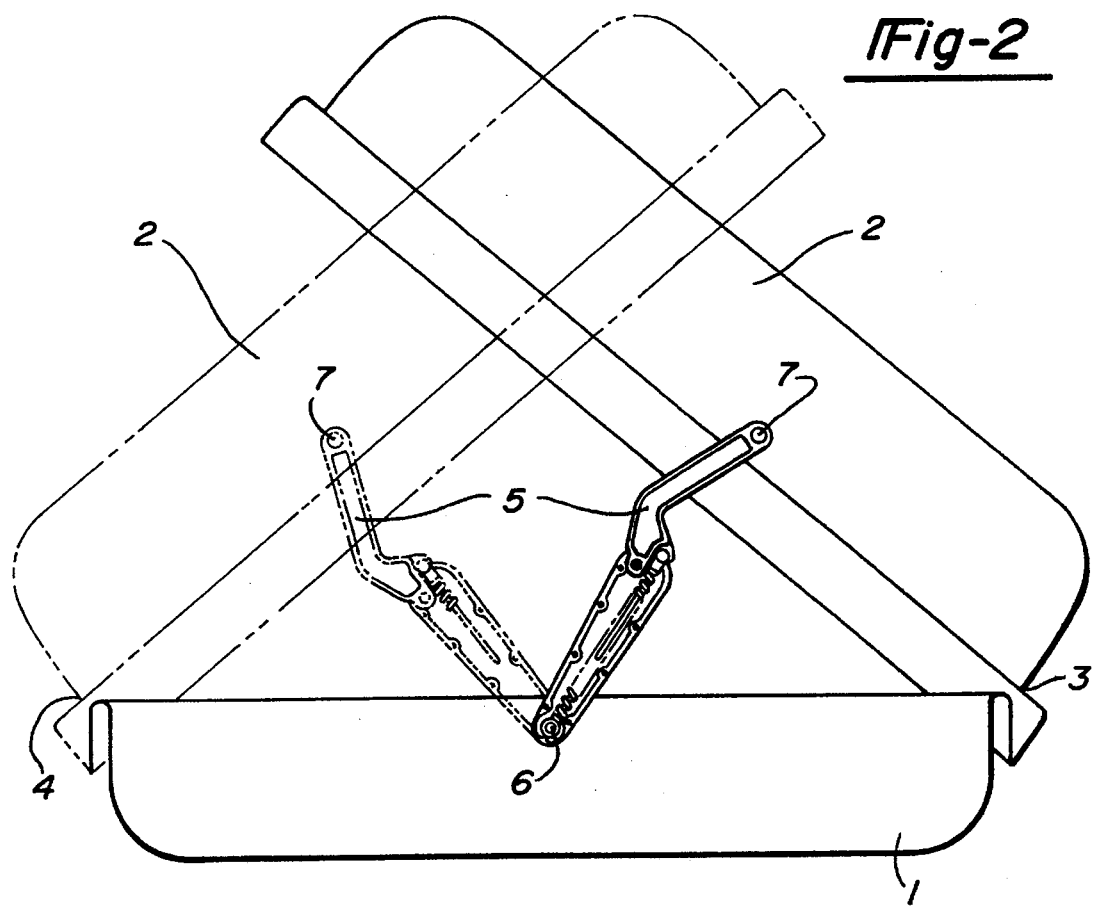
FIG. 2 is a view like FIG. 1 with the continuous lines referring to the closing element in the open position pivoted to the right and the dashed lines referring to the closing element in the open position pivoted to the left.

FIG. 1 shows the container 1 with the closing element 2 in the closed position. The container 1 constitutes a roof trunk for a motor vehicle, used for transporting additional goods.

The two side edges have been given the reference numbers 3 and 4. The side edges constitute the edges where the closing element 2 is connected to the container 1 by hinges designed such that the hinges associated with one edge 3 or 4 are closed, with the hinges associated with the other edge being open. The closing element 2 is held in the closed or open position relative to the container 1 by a support 5. The support 5 is pivotably connected to the container 1 by a pivot bearing 6 and to the closing element 2 by a pivot bearing 7. The center of each pivot bearing 6, 7 is arranged on the center line 8 (in the closed position). The center line 8 is located at half the distance between the two side edges 3, 4 and their hinge axes.

The support 5 includes of two arms 9, 10. The first arm 9 is connected to the container 1 by the pivot bearing 6 and the second arm 10 is connected to the closing element 2 by the pivot bearing 7. In the closed position as illustrated, the two pivot bearings 6, 7 are positioned close to one another.

If, for example, the closing element 2 is pivoted clockwise upwardly around the hinge axis of the side edge 3, away from the container 1, the angle between the two arms 9, 10 is simultaneously increased, with the two pivot bearings 6, 7, in their position corresponding to the open position of the closing element 2, positioned at the greatest possible distance from one another.

Alternatively, the closing element 2 may also be pivoted counterclockwise away from the container 1, as indicated by the dashed lines. Here the pivot bearings 6, 7 move away from one another accordingly. By arranging the pivot bearings 6, 7 on the center line 8, it is possible to pivot the closing element 2 in two directions.

FIGS. 3 to 5 illustrate the support 5 with its individual components. The support 5 includes the first arm 9 and the second arm 10. The second arm 10 is formed by a housing 11 and a cover 12 which are connected to one another by journals 14. The second arm 10 is supported in a third pivot bearing 13 in a cavity 19 between the housing 11 and the cover 12. The pivot bearing 13 includes a pin, for example, supported on the housing 11, and a bore of the second arm 10 by means of which the latter is located on the pin. The second arm 10 is laterally guided between the housing 11 and the cover 12 and projects from the first arm 9 out of a through-aperture 25. The second arm 10 includes a bearing bore 26 provided at the arm end opposed to the pivot bearing 13 and, together with a fitting, it forms the pivot bearing 7. At its end facing away from the third pivot bearing 13, the first arm 9 also includes a bearing bore 15 which, together with a suitable fitting, forms the pivot bearing 6.

The pressure spring 16, by its first end 17, is supported on the outer contour of the wall of the housing 11 surrounding the bearing bore 15. A bearing lever 20 with a guiding rod 24 extends into the second end 18 of the pressure spring 16. The pressure spring 16 is supported on the bearing lever 20 by its second end 18. The bearing lever 20 includes a bearing pin 21 which is accommodated in a bearing bore 22 in a recess 23 of a projection of the second arm 10. The bearing bore 22 is arranged eccentrically relative to the pivot axis of the pivot bearing 13. The second arm 10 is provided with a stop 31 which comes to rest against a second stop 30 of the housing 11, as illustrated in FIGS. 3 and 4, the second arm 10 assumes its pivoted position relative to the first arm 9. The stop 30 delimits the through-aperture 25.

The connecting line between the center of the bearing bore 15 of the first arm 9 and the pivot axis of the pivot bearing 13 has been given the reference number 27. The eccentric arrangement of the bearing bore 22 is such that, in the pivoted position of the second arm 10 relative to the first arm 9, which corresponds to the open position of the closing element, relative to the container (see FIGS. 3 and 4), support is provided by a pressure spring 16 with an effective lever arm including an eccentricity 29 which is dimensioned in such a way that the weight of the closing element is supported to the required extent.

If the second arm 10 is pivoted clockwise around the pivot bearing 13 towards the first arm 9, there results an end position which corresponds to the position as illustrated in FIG. 5.

In the process, the bore together with tile bearing pin 21 or the bearing lever 20, accommodated thereby, and thus the supporting point of the pressure spring 16 on the second arm also pivot around the axis of the third pivot bearing 13 beyond the dead center represented by the connecting line 27 into the end position having the eccentricity 28, which is dimensioned in such a way as to ensure an adequate closing force of the closing element on the container. It can thus be seen that the position-dependent supporting means in the form of the pressure spring 16 include effective lines which act eccentrically relative to the pivot bearing 13 and are offset towards different sides of the connecting line 27.

While the above detailed description describes the preferred embodiment of the present invention, the invention is susceptible to modification, variation, and alteration without deviating from the scope and fair meaning of the subjoined claims.

I claim:

1. A support for holding a closing element, especially a flap or lid, in a closed or open position relative to a container to be closed thereby, and the closing element which is optionally pivotable around the one or the other of two side edges extending parallel relative to one another, comprising:

a first and a second arm, with one of the arms being connected to the container by a first pivot bearing and the other arm being connected to the closing element by a second pivot bearing and with the two arms being connected to one another by a third pivot bearing said pivot bearing on the first arm at the container and the pivot bearing of the second arm at the closing element each being articulated centrally between the two side edges at the container and the closing element respectively;

a pressure spring operational between said arms and said arms being supported relative to one another in a first arm position, which corresponds to the closed position, and in which the pivot bearings are close to one another, or in a second arm position, which corresponds to the open position, and in which the pivot bearings are positioned so as to be remote from one another, one end of the pressure spring is supported on the first arm and the other end at the second arm;

at the second arm, the pressure spring is supported eccentrically relative to the third pivot bearing connecting the two arms;

in the second position of the arms corresponding to the open position, the point of application of the pressure spring at the second arm is offset towards one side of the connecting line extending between the center of the first pivot bearing at the first arm and the third pivot bearing between the two arms and that in the closed first position it is offset towards the other side of the connecting line.

2. A support according to claim 1, wherein the second position of the arms relative to one another, which corresponds to the open position, is delimited by stops.

3. A support according to claim 2, wherein with reference to the connecting line, the eccentricity and thus the effective lever arm of the pressure spring in the first position of the arms, corresponding to the closed position, and the spring characteristics of the pressure spring are based on the required closing force.

4. A support according to claim 1, wherein with reference to the connecting line, the eccentricity and thus the effective lever arm of the pressure spring in the second position of the arms, corresponding to the open position, and the spring characteristics of the pressure spring are based on the supporting force required for the closing element.

5. A support according to claim 1, wherein said first arm includes a housing and a cover, with a through aperture for the second arm being provided between the housing and the cover, the second arm is laterally guided between the housing and the cover and the pressure spring is accommodated in the cavity between the cover and the housing.

6. A support according to claim 1, wherein the pressure spring is received on a guiding rod which is provided with a bearing lever.

7. A support according to claim 6, wherein the bearing lever and a bearing bore of the second arm constitute the supporting means for the pressure spring at the second arm.

8. A support according to claim 1, wherein the two arms are made of plastics, especially acetal homopolymer (POM).

* * * * *